United States Patent
Wang-Chen

[11] Patent Number: 6,082,530
[45] Date of Patent: Jul. 4, 2000

[54] MOBILE TELEPHONE CASE

[76] Inventor: Yu-Lien Wang-Chen, 304 Ya Hsin Street, Ma Hsin Village, Show Shiue Hsiang, Chan Hua Hsien, Taiwan

[21] Appl. No.: 09/478,361
[22] Filed: Jan. 6, 2000
[51] Int. Cl.⁷ .................................................. B65D 85/30
[52] U.S. Cl. ........................................................ 206/45.24
[58] Field of Search .................................... 206/320, 305, 206/576, 452.24, 1.5

[56] References Cited

U.S. PATENT DOCUMENTS

| | | | |
|---|---|---|---|
| 4,972,943 | 11/1990 | Fludd | 206/45.24 |
| 5,195,634 | 3/1993 | Zaug | 206/320 |

Primary Examiner—Jacob K. Ackun
Attorney, Agent, or Firm—Bacon & Thomas, PLLC

[57] ABSTRACT

A mobile telephone case comprises a main body and a support frame. The main body is provided with a receiving space to accommodate the mobile telephone and with two pivoting holes. The support frame is of a U-shaped construction and is provided at the free end of two arms thereof with a pivoting piece having a through hole. The support frame is pivotally fastened with the main body by two pivots which are engaged with the two pivoting holes of the main body via the two through holes of the two pivoting pieces of the support frame. The main body can be tilted pieces of the support frame. The main body can be tilted on a surface by the support frame.

1 Claim, 3 Drawing Sheets

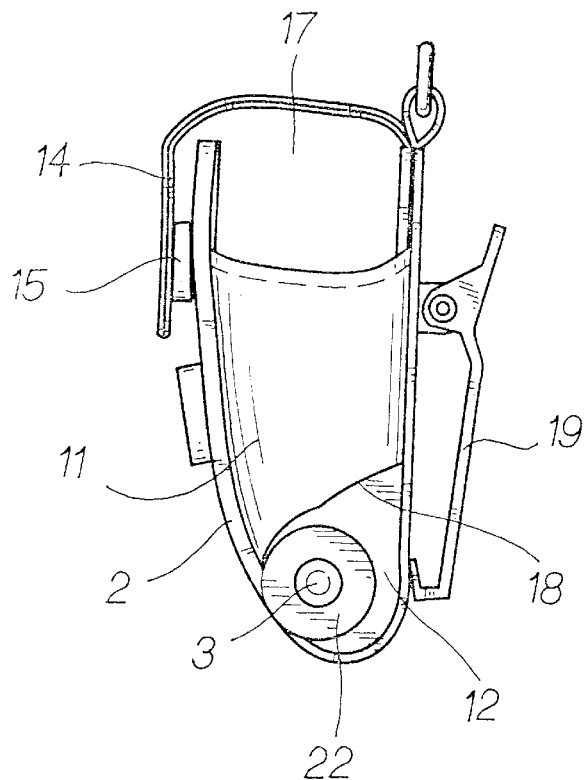
FIG. 2-A
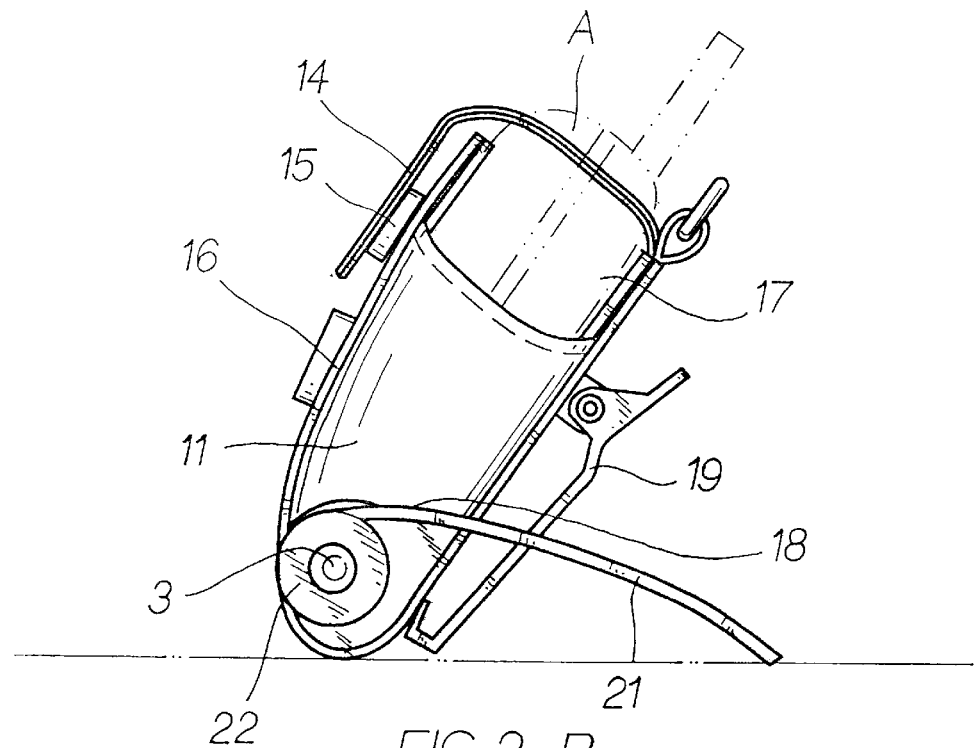
FIG. 2-B

MOBILE TELEPHONE CASE

FIELD OF THE INVENTION

The present invention relates generally to a mobile telephone accessory, and more particularly to a mobile telephone case.

There are a variety of cases for carrying mobile phones. These conventional mobile phone cases are designed in accordance with the profiles of the mobile phones. Generally speaking, the conventional mobile phone cases comprise a main body and a retaining piece to facilitate the attaching of the mobile phone to the belt. The main body is provided with a space to accommodate the mobile phone.

The conventional mobile phone cases are defective in design in that the mobile phones can not be easily placed in an upright position on a surface without the help of an object.

SUMMARY OF THE INVENTION

The primary objective of the present invention is to provide a mobile telephone case free from the drawback of the conventional mobile phone cases described above.

In keeping with the principle of the present invention, the foregoing objective of the present invention is attained by a mobile telephone case comprising a main body, a support frame, and a plurality of pivots. The main body is provided with a space to accommodate a mobile phone. The support frame is of a U-shaped construction and is provided at the free end of two arms thereof with a pivoting piece. The support frame is fastened pivotally with the main body by the pivots.

The foregoing objective, features, and functions of the present invention will be more readily understood upon a thoughtful deliberation of the following detailed description of a preferred embodiment of the present invention with reference to the accompanying drawings.

BRIEF DESCRIPTION OF THE DRAWINGS

FIG. 2A shows a side view of the preferred embodiment of the present invention in combination.

FIG. 2B shows a schematic view of the preferred embodiment of the present invention in use.

DETAILED DESCRIPTION OF THE INVENTION

As shown in all drawings provided herewith, a mobile telephone case of the preferred embodiment of the present invention comprises a main body 1, a support frame 2, and a plurality of pivots 3 for fastening pivotally the support frame 2 with the main body 1. A mobile telephone "A" is housed in the main body 1 of the mobile telephone case.

Figure 1:
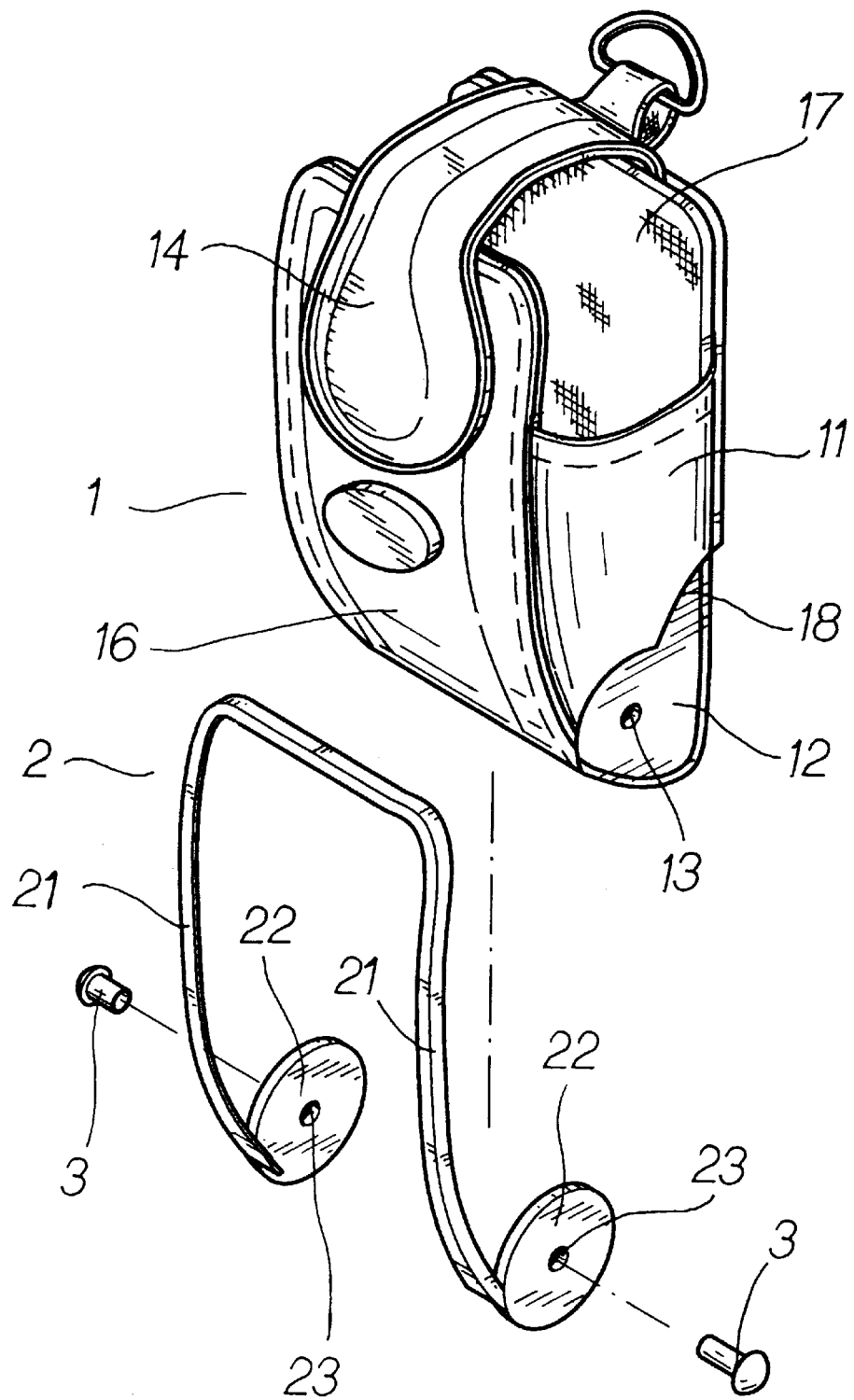
FIG. 1 shows an exploded view of the preferred embodiment of the present invention.
Figure 2:
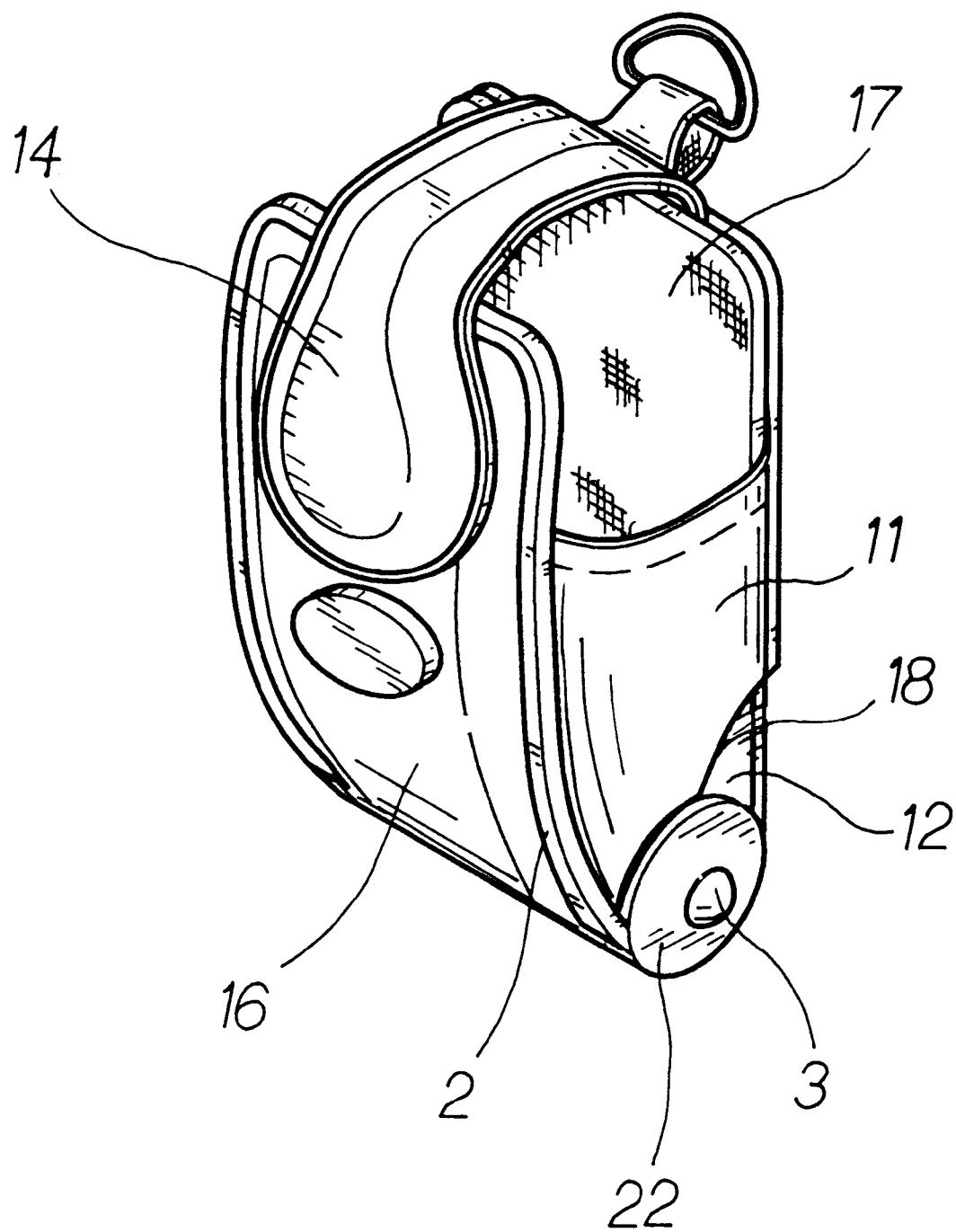
FIG. 2 shows a perspective view of the preferred embodiment of the present invention in combination.

The main body 1 is provided with two lateral sides 11 opposite to each other and having a recessed portion 12. The recessed portion 12 is provided with a pivoting hole 13. The main body 1 is further provided with a front side 16, a rear side 17 and a receiving space defined by the tour sides 11, 16, and 17 of the main body 1. The receiving space is intended to accommodate a mobile telephone. The rear side 17 Is provided with a lug 14 which is provided in the inner side thereof with a male retainer 15. The front side 16 is provided in the outer side thereof with a female retainer (not shown in the drawings). The lug 14 is detachably fastened with the front side 16 such that the male retainer 15 of the lug 14 is engaged with the female retainer of the front side 16. The main body 1 if further provided in the outer side of the rear side 17 thereof with a clamping piece 19 which is pivotally fastened at one end thereof with the rear side 17 of the main body 1, as shown in FIGS. 2A and 2B. The recessed portion 12 of the two lateral sides 11 is provided with a stop surface 18.

The support frame 2 is of a U-shaped construction and is provided at the free end of two arms 21 thereof with a pivoting piece 22. The pivoting piece 22 has a through hole 23. The support frame 2 is fastened pivotally with the main body 1 by two pivots 3 which are engaged with the two pivoting holes 13 of the main body 1 via the through holes 23 of the pivoting pieces 22 of the support frame 2. The mobile telephone "A" can be tilted on a surface by the support frame, as illustrated in FIG. 2B, such that the two arms 21 of the support frame 2 are stopped by the stop surfaces 18 of the recessed portions 12 of the main body 1.

The embodiment of the present invention described above is to be regarded in all respects as being merely illustrative and not restrictive. Accordingly, the present invention may be embodied in other specific forms without deviating from the spirit thereof. The present invention is therefore to be limited only by the scope of the following appended claim.

What is claimed is:

1. A mobile telephone case comprising:

a main body provided with two lateral sides opposite to each other and having a recessed portion which is provided with a pivoting hole and a stop surface, said main body further provided with a front side, a rear side, and a receiving space formed and defined by said lateral sides, said front side and said rear side for accommodating a mobile telephone, said rear side provided with a lug having a male retainer, said front side provided with a female retainer, said lug being detachably fastened with said front side such that said male retainer of said lug is engaged with said female retainer of said front side, said main body further provided in an outer wall of said rear side thereof with a clamping piece fastened pivotally therewith; and a support frame of a U-shaped construction and provided at the free end of two arms thereof with a pivoting piece having a through hole, said support frame being fastened pivotally with said main body by two pivots whereby said two pivots are engaged with said two pivoting holes of said main body via said through holes of said pivoting pieces of said support frame, said two arms of said support frame being stopped by said stop surfaces of said recessed portions of said main body whereby said main body is tilted on a surface.

* * * * *